June 9, 1953 H. J. DUNKELOW 2,641,345
ADJUSTABLE CAM OPERATED CLUTCH
Filed Feb. 15, 1949 3 Sheets-Sheet 3
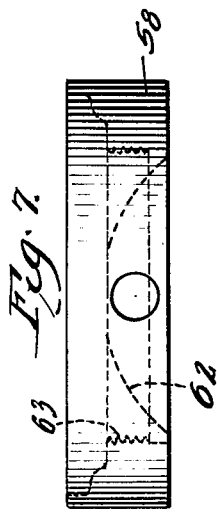
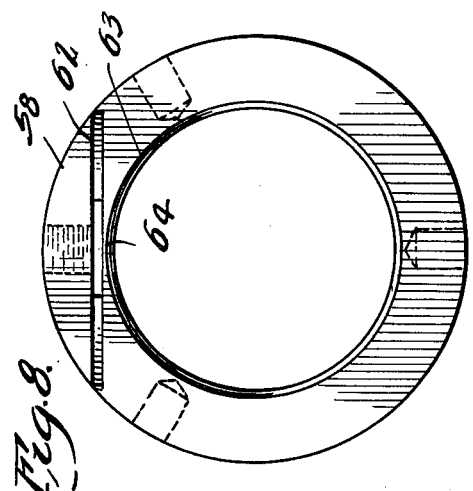
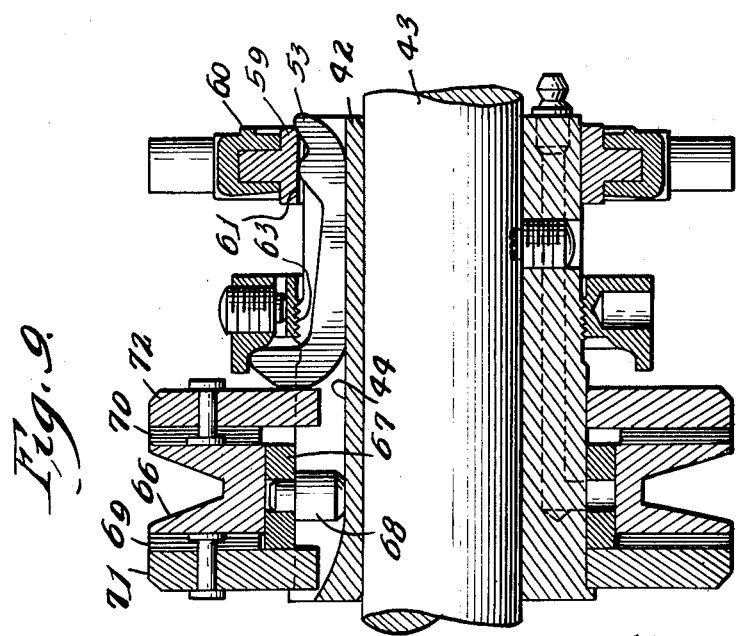
Inventor.
Henry J. Dunkelow.
By John Darley
Attorney.

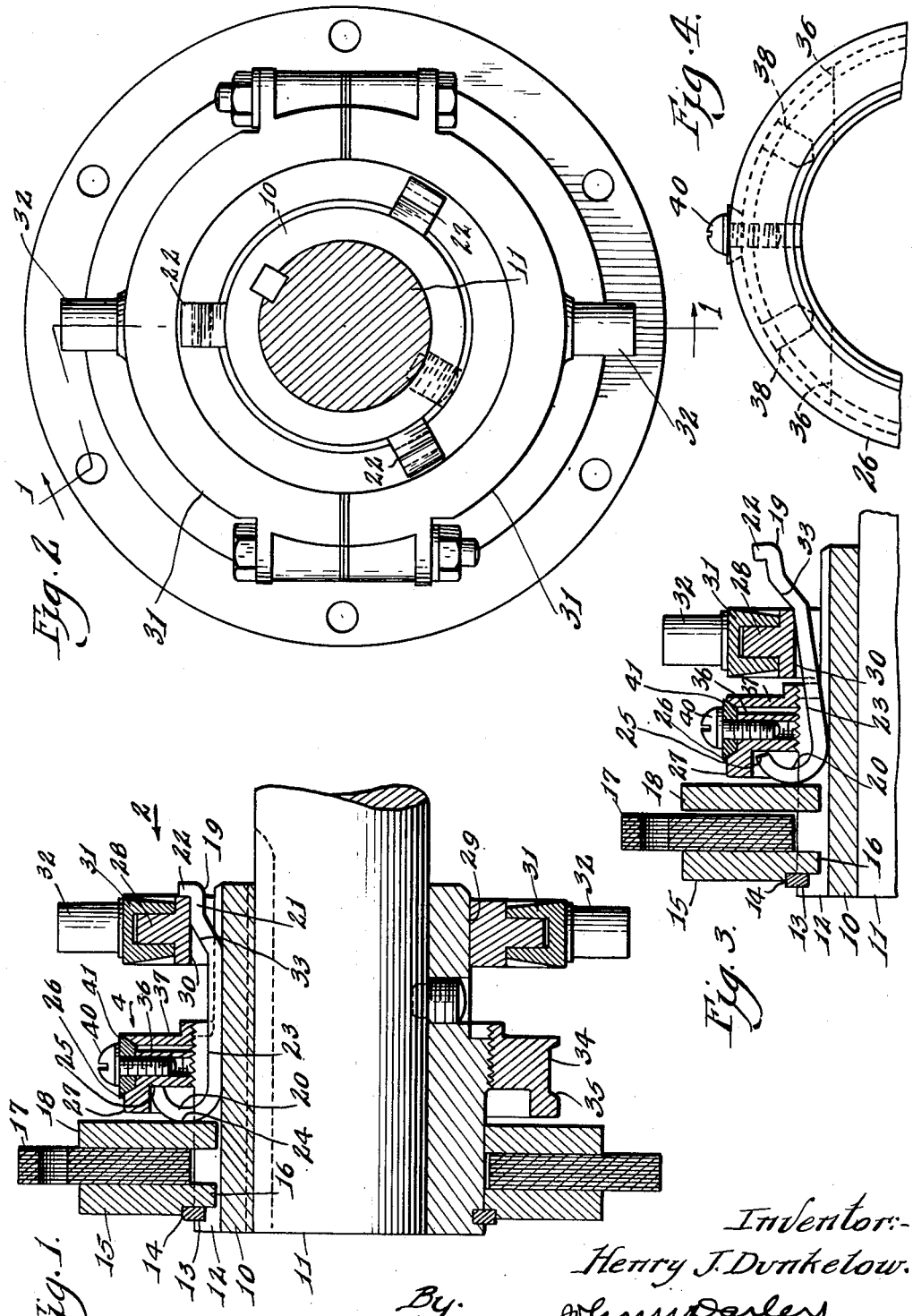

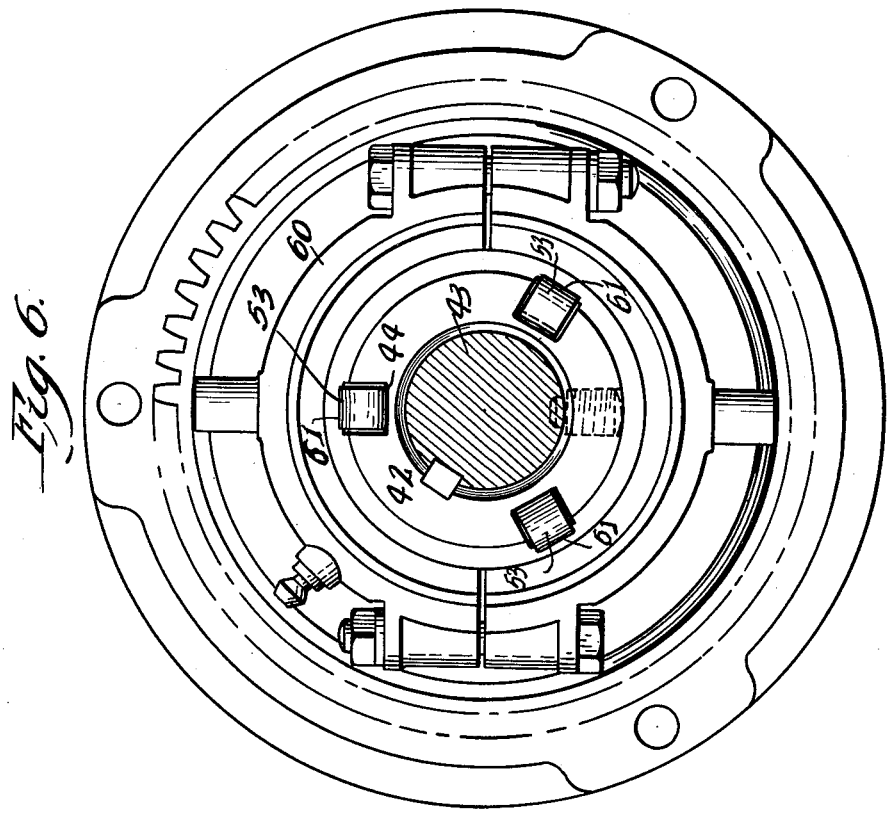
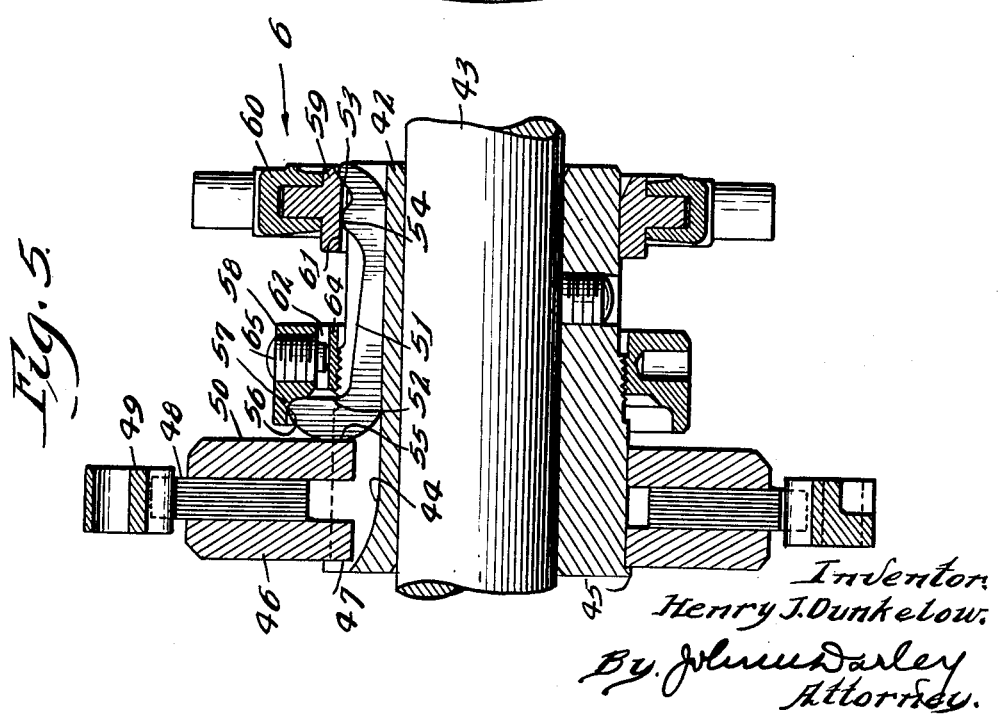

Patented June 9, 1953

2,641,345

UNITED STATES PATENT OFFICE 2,641,345

ADJUSTABLE CAM OPERATED CLUTCH

Henry J. Dunkelow, Racine, Wis., assignor to Twin Disc Clutch Company, Racine, Wis., a corporation of Wisconsin Application February 15, 1949, Serial No. 76,523

9 Claims. (Cl. 192—69)

My invention relates to clutches and more particularly to a device of this type which is mechanically or positively actuated into driving position, as contrasted with clutches of the spring loaded type.

One object of the invention is to devise a clutch of the plate type having operating mechanism for mechanically engaging the same which tends to release under the impulse of centrifugal force so that the clutch runs free in the disengaged position.

A further object is the provision of an operating mechanism having levers which are characterized by a floating or wandering action, as compared with the usual fixed pivot construction, thus enabling the levers to position themselves for the easiest operation possible.

A further object is to provide a clutch of the type indicated which is characterized by compactness, a high degree of efficiency, a capacity for being embodied in various specific adaptations to meet different operating conditions, and which is susceptible of rapid production due to the fact that numerous parts are either simple stampings or capable of automatic manufacture.

Additional objects are the securement in a compact clutch structure of an adequate mechanical advantage in the operating mechanism for insuring the application of the required clamping pressure, ease of adjustment as the plates wear, a positive locking of the clutch plates in the driving position, and a positive release of the clutch levers during disengagement.

A further object is to devise a novel means for maintaining the adjusting ring in adjusted position, the means having general application to the securement of any ring, collar, nut or similar element to a part encircled by such an element.

This application is a continuation-in-part of my copending application for Clutch, Ser. 625,760, filed October 31, 1945, now abandoned.

These and further objects of the invention will be set forth in the following specification, reference being had to the accompanying drawing, and the novel means by which said objects are effectuated will be definitely pointed out in the claims.

In the drawings:

Fig. 1 is a sectional elevation of one form of the clutch in engaged position as taken along the line 1—1 in Fig. 2.

Fig. 2 is an end view of the clutch looking in the direction of the arrow 2 in Fig. 1.

Fig. 3 is a fragmentary, sectional elevation similar to Fig. 1 showing the clutch disengaged.

Fig. 4 is a view of the upper portion of the adjusting ring showing the means for locking the same in adjusted position.

Fig. 5 is a sectional elevation showing another modification of the clutch which incorporates a different arrangement for maintaining the adjustment of the adjusting ring.

Fig. 6 is an end view of the clutch shown in Fig. 5 looking in the direction of the arrow 6.

Figs. 7 and 8 are top and end views of the adjusting ring shown in the Fig. 5 clutch.

Fig. 9 is a sectional elevation showing a modification of the Fig. 5 clutch in which a belt sheave serves as the driving member of the clutch.

Referring to Figs. 1 to 4 of the drawings, the numeral 10 designates a hub which is keyed to a shaft 11 and which, in the present instance, will be regarded as the driven member of the clutch although the construction is not limited in that respect since the hub 10 may be utilized as the driving member without interfering with the efficient and positive operation of the clutch. The periphery of the hub is provided with a plurality of keyways 12 that are preferably circumferentially equispaced and also at the left end, as viewed in Fig. 1, with an annular channel 13 in which is seated a split ring 14 that constitutes an abutment for a clamping plate 15. The plate 15 is provided with teeth 16 that fit into the keyways 12 so that the plate rotates with the hub 10 but may shift endwise thereof.

The plate 15 frictionally engages with one side of a driving plate 17 that is bolted or otherwise secured to a driving member (not shown), the mode of attachment preferably permitting a slight axial movement of the plate 17 when the latter is disengaged so that it will run free of the clamping plate 15. The driving plate 17 is shown as being molded from a friction material, but may be arranged as a metallic plate having friction facings on its opposite sides. The opposite surface of the plate 17 is engaged by a second clamping plate 18 that is formed like the plate 15 and has the same operative relation to the hub 10.

The particularly novel feature of the clutch resides in the operating mechanism which comprises a plurality of clutch levers 19, each of which is mounted in one of the keyways 12. Each lever is made from a flat strip with one end bent to form a hook 20 and the opposite end bent to provide an offset 21 that terminates in a laterally bent, stop finger 22. Between the hook 20 and the offset 21, the lever is straight as at 23 and, when in the engaged position shown in Fig. 1, rests on the floor of the associated keyway 12. Each lever has a free, sliding fit in its keyway and its thickness is such that, except for the hook 20 and the offset 21, each lever is generally housed in one of the keyways.

In the position shown in Fig. 1, the bights 24 of the hooks 20 bear against the clamping plate 18 while the ends 25 of the hooks bear against the adjacent face of an adjusting ring 26 that is threaded on the hub 10. The ring 26 may include an annular flange 27 that partially overhangs the hooks 20. Endwise movements of the levers 19 are therefore limited by the clamping plate 18 and the adjusting ring 26, but within these limits, the levers are capable of moving with a free rocking action relative to the ring 26 and the plate 18 since they are not restrained by any fixed pivot connections to the hub 10.

In order to restrain the levers against outward movement by centrifugal action and to operate the levers, a collar 28 encircles the hub 10, inclusive of the levers 19, and the inner periphery of the collar is shaped as an annular, flat surface 29 which provides a bearing on the hub. The collar 28 is cut outwardly from the surface 29 to create a plurality of recesses 30, each of which registers with a keyway 12 and receives a part of the associated lever depending upon the position of the collar, thus preventing rotation of the collar 28 relative to the hub 10. Endwise shifting of the collar along the hub is achieved by means of ring segments 31—31 which are bolted together and each of which carries a trunnion 32 which is engaged in the usual manner by a shifting fork (not shown).

As illustrated in Fig. 1, the clutch is in driving position. The adjusting ring flange 27 which overlies the hook ends 25 and the collar 28 which engages the lever offsets 21 restrain the levers against outward movement due to centrifugal force, while the collar additionally maintains the levers in the clamping positions shown; i. e., the bights bearing against the clamping plate 18 and the hook ends 25 fulcruming against the adjusting ring 26 which acts as an abutment for the adjacent ends of the levers. The collar 28 is substantially locked against inadvertent release shifting towards the left by reason of the frictional pressure between the latter parts being exerted contact between the offsets 21 and the recesses 30, the pressure between the latter parts being exerted radially of the clutch, so that the operation of the clutch, when in driving position, tends to maintain the clutch in this position.

To release the clutch, the collar 28 is moved towards the left, as viewed in Fig. 1, to the position shown in Figure 3, whereupon the levers rock and each assumes the position shown in the last noted figure. The bights 24 are released from pressing on the clamping plate 18 so that the latter is free to separate from driving contact with the driving plate 17.

In engaging the clutch, the collar 28 is moved towards the right from the position shown in Fig. 3, thus engaging the inclined portion 33 of each lever that connects the offset 21 with the straight portion 23. The levers are accordingly rocked inwardly of the clutch with their ends 25 fulcruming on the adjusting ring 26 and the bights 24 bearing against and moving the clamping plate 18 to gripping position. The fingers 22 provide a limiting stop to the movement of the collar 28 to engaging position. As the driving plate 17 wears, the required adjustment can be easily effected by the ring 26 which is moved to maintain the desired fulcruming relation with the ends 25 of the clutch levers. The adjusted position of the ring 26 may be locked by any of the expedients commonly employed in clutches for this purpose.

Because the clutch levers 19 can move freely in the keyways 12, they readily accommodate themselves to the several positions required under the different operating conditions, thus avoiding any undue strain on the parts of the clutch. The clutch construction is very compact and the lever arm relation between the bight 24 and the ends of each lever provides a high mechanical advantage in operating the clutch. The inclined portion 33 on each clutch lever insures a quick movement inwardly of the clutch during the engaging action and enables the lever to be correspondingly shortened and the travel of the collar 28 to be reduced.

One of the most important features of the clutch is its relatively low cost of construction. For example, the levers 19 may be made as simple, appropriately bent stampings; the clamping plates 15 and 16 are duplicates, except for the annular recess in the plate 15 which receives the split ring 14, while the adjusting ring 26 and the collar 28 may be manufactured by automatic machinery. A further advantage resides in the fact that the same keyways are employed to provide a driving engagement with the clamping plates 15 and 18 and as recesses for the clutch levers 19. Moreover, as soon as the collar 28 has cleared the offsets 21 when moved in a releasing direction, the pressure on the clamping and driving plates is relieved by reason of centrifugal force rocking each lever to the position shown in Fig. 3.

A suggested method of locking the adjusting ring 26 in adjusted position is shown in Figs. 1 and 4. An annular groove 34 having sloping side walls 35 is formed in the periphery of the ring 26 and a segmental slot 36 is cut through the upper portion of the ring, as viewed in Fig. 1, between the opposite faces. The slot 36 intersects portions of the base of the groove 34 and the threaded bore of the ring 26 and is closer to one face thereof than to the other, thus creating a parti-annular fin 37. Adjacent the ends of the slot are radial pockets 38—38 which extend inwardly from the base of the groove and preferably terminate short of the ring bore. Midway between the pockets 38 is a radial, threaded hole 39 for receiving a cap screw 40 that wedgingly clamps a frusto-conical washer 41 in the groove 34 to thereby distort the annular fin 37 sufficiently to bind the threaded portion of the fin on the threaded portion of the hub, thus holding the ring 26 in adjusted position. The pockets 38 provide the necessary relief adjacent the ends of the slot 36 to facilitate distorting the fin 37; the pockets including portions of the slot.

In Figs. 5 and 6 is illustrated a modified form of the clutch whose principal difference resides in the means for holding the adjusting ring in adjusted position. Referring to these figures, the numeral 42 designates a hub which is keyed to a shaft 43 and the periphery of the hub is provided with a plurality of keyways 44 that are preferably equispaced around the hub and at the left end, as viewed in Fig. 5, with an annular shoulder 45 that serves as an abutment for a clamping plate 46. The plate 46 is provided with teeth 47 that fit into the keyways 44 so that the plate rotates with the hub 42 and may move axially thereof.

The plate 46 frictionally engages with one side of a driving plate 48 which is peripherally toothed for driven engagement with an internally toothed, driving ring 49 that may be bolted to a source of power (not shown). The opposite surface of the plate 48 is engaged by a second clamping plate 50 that is slidable on the hub 42 and has toothed connection with the keyways 44.

Except for the adjusting ring, the operating mechanism of this clutch is generally similar to that shown in Fig. 1 and includes a plurality of clutch levers 51, each of which is mounted in a keyway 44. Each lever is preferably made from powdered metal and is shaped at one end with a hook 52, at the opposite end with a nose 53 that inclines outwardly with respect to the axis of the clutch, and adjacent the nose with a radially outward hump or offset 54, all for purposes presently explained. Between its ends, the lever 51 is generally straight, and, in the engaged position shown in Fig. 5, rests on the floor of the associated keyway 44. Each lever has a free, sliding fit in its keyway and, aside from the hook 52, nose 53 and hump 54, is generally housed in the keyway.

In the position shown in Fig. 5, the bights 55 bear against the clamping plate 50 while the ends 56 seat in and fulcrum against an annular pocket 57 provided in an adjusting ring 58 that is threaded on the hub 42. Actuation of the levers 51 is effected by a collar 59 that is slidable along the hub by means of trunnion equipped and bolted together segments 60, all as illustrated for the Fig. 1 clutch. The collar 59 is provided with a plurality of internal recesses 61, each of which registers with a keyway 44 for receiving a hump 54 to prevent relative rotation of the collar and the end of each recess remote from the adjusting ring 58 is beveled outwardly to engage the associated nose 53 and thus limit the engaging movement of the collar 59.

The operation of the clutch shown in Fig. 5 is generally similar to that shown in Fig. 1 and is characterized by the same advantages and relation of parts. The levers 51 are conditioned for a free rocking action with respect to the hub 42 and adjusting ring 58 and, in the released position of the clutch, will occupy positions similar to the levers as shown in Fig. 3.

One of the important features of this form of the clutch resides in the manner of maintaining the adjustment of the adjusting ring 58, as illustrated in Figs. 5, 7 and 8. The end face of the ring 58 that is nearest to the collar 59 is cut towards the other end face, as by a circular saw, to form an arcuate, chordal slot 62 which intersects the latter end face and is symmetrical with respect to a selected diameter of the ring 58. The slot is closer to the threaded bore 63 than to the outer periphery of the ring 58 to thus create a relatively thin wall 64 of limited extent circumferentially of and immediately adjacent the threaded bore. The wall 64 is engaged by the inner end of a radial set screw 65 threaded in the ring 58 and when this screw is moved inwardly of the ring, the wall 64 is deflected or distorted sufficiently to clamp the adjacent portion of the hub threads and so lock the ring in position. When the screw 65 is withdrawn, the elastic characteristics of the metal comprising the ring returns the wall 64 to normal or non-gripping position so that the ring 58 may be moved to a new position. This method of locking the ring possesses the outstanding advantage of preserving the integrity of the hub threads and also of not marring or damaging the ring 58.

While possessing specific advantages for holding an adjusting ring in position, the locking arrangement above described is applicable generally to the position maintenance of any element, such as a ring, collar, nut or similar element that is mounted in encircling relation to another part and is so claimed.

The clutch shown in Fig. 9 is identical with that shown in Fig. 5 with the exception that a belt sheave 66 is substituted for the driving plate 48, like parts being designated by like numerals. The sheave 66 is journaled on a bearing 67 that encircles the left end of the hub 42 and is held against relative rotation by means of a pin 68 that slidably fits within one of the keyways 44. The opposite sides of the sheave are engaged by friction rings 69 and 70 carried by clamping plates 71 and 72, all respectively, the plates having toothed and sliding engagement with the hub. The operation of this clutch is the same as the Fig. 5 clutch.

I claim:

1. In a clutch, the combination of a friction plate, a clamping plate arranged to engage the friction plate, a hub to which the clamping plate is connected for rotation therewith and for axial movement relative thereto and having depressions disposed around the periphery thereof, an adjusting ring mounted on the hub, clutch levers in the depressions each comprising a strip shaped as a hook at one end between the ring and the clamping plate, and means movable on the hub away from the ring for actuating the opposite ends of the levers to press the plates into engagement, the ends of the hooks fulcruming against the ring and the bights of the hooks pressing against the clamping plate.

2. In a clutch, the combination of a friction plate, a clamping plate arranged to engage the friction plate, a hub to which the clamping plate is connected for rotation therewith and for axial movement relative thereto and having depressions disposed around the periphery thereof, an adjusting ring mounted on the hub, clutch levers in the depressions each comprising a strip shaped as a hook at one end between the ring and the clamping plate and having at the opposite end a portion offset outwardly of the hub, and means movable on the hub away from the ring for actuating the lever offsets to press the plates into engagement, the ends of the hooks fulcruming against the ring and the bights of the hooks pressing against the clamping plate.

3. In a clutch, the combination of a friction plate, a clamping plate arranged to engage the friction plate, a hub to which the clamping plate is connected for rotation therewith and for axial movement relative thereto and having depressions disposed around the periphery thereof, an adjusting ring mounted on the hub, clutch levers in the depressions each comprising a member shaped as a hook at one end between the ring and the clamping plate, and means movable on the hub away from the ring for rocking the opposite ends of the members toward the hub to press the plates into engagement, the ends of the hooks fulcruming against the ring and the bights of the hooks pressing against the clamping plate.

4. In a clutch, the combination of a friction plate, a clamping plate arranged to engage the friction plate, a hub to which the clamping plate is connected for rotation therewith and for axial movement relative thereto and having depressions disposed around the periphery thereof, an adjusting ring mounted on the hub, clutch levers in the depressions each comprising a member shaped as a hook at one end between the ring and the clamping plate, and means movable on the hub away from the ring for rocking the opposite ends of the members towards the hub to press the plates into engagement, the ends of the hooks fulcruming against the ring and the bights of the hooks pressing against the clamping plate, each said opposite member end having a stop for limiting the engaging movement of the means.

5. In a clutch, the combination of a friction plate, a clamping plate arranged to engage the friction plate, a hub to which the clamping plate is connected for rotation therewith and for axial movement relative thereto and having depressions disposed around the periphery thereof, an adjusting ring mounted on the hub, clutch levers rockably mounted in and radially of the depressions between positions of release and engagement and free of any connection to the hub radially thereof, and means engageable with the levers and shiftable on the hub towards and away from the ring corresponding, respectively, to positions of release and engagement, one end of each lever during engagement fulcruming against the ring and an intermediate portion of the lever pressing against the clamping plate.

6. In a clutch, the combination of a friction plate, a clamping plate arranged to engage the friction plate, a hub to which the clamping plate is connected for rotation therewith and for axial movement relative thereto and having depressions disposed around the periphery thereof, an adjusting ring mounted on the hub, clutch levers in the depressions each comprising a member shaped as a hook at one end between the ring and the clamping plate and having adjacent the opposite end a portion extending outwardly of the hub, and means movable on the hub away from the ring for actuating the lever portions to press the plates into engagement, the ends of the hooks fulcruming against the ring and the bights of the hooks pressing against the clamping plate.

7. In a clutch, the combination of a friction plate, a clamping plate arranged to engage the friction plate, a hub to which the clamping plate is connected for rotation therewith and for axial movement relative thereto and having depressions disposed around the periphery thereof, an adjusting ring mounted on the hub, clutch levers in the depressions each comprising a member shaped as a hook at one end between the ring and the clamping plate, and a collar including recesses registering with the depressions for receiving the opposite ends of the members to prevent rotation of the collar relative to the hub, the end of each recess remote from the ring being beveled outwardly, the collar being movable on the hub away from the ring for rocking said opposite ends towards the hub to press the plates into engagement, the ends of the hooks fulcruming against the ring and the bights of the hooks pressing against the clamping plate, each said opposite member end including a part engageable with the beveled end of the associated recess for limiting the engaging movement of the collar.

8. In a clutch, the combination of a friction plate, a clamping plate arranged to engage the friction plate, a hub to which the clamping plate is connected for rotation therewith and for axial movement relative thereto and having depressions disposed around the periphery thereof, an adjusting ring threaded on the hub and including a slot extending between the end faces of the ring, the slot forming a relatively thin portion of the ring adjacent its threaded bore, means carried by the ring and engageable with the thin portion for forcing the same into contact with the hub threads for maintaining the position of the ring, clutch levers in the depressions for pressing the plates into engagement and free of any connection to the hub radially thereof, and means shiftable on the hub away from the ring for actuating the levers to engage the plates, one end of each lever fulcruming against the ring and an intermediate portion of the lever pressing against the clamping plate.

9. In a clutch, the combination of a friction plate, a clamping plate arranged to engage the friction plate, a hub to which the clamping plate is connected for rotation therewith and for axial movement relative thereto and having depressions disposed around the periphery thereof, an adjusting ring threaded on the hub and including an arcuate, chordal slot extending from one end face of the ring with the central part of the slot intersecting the other end face, the slot forming a relatively thin portion of the ring adjacent its threaded bore, means carried by the ring and engageable with the thin portion for forcing the same into contact with the hub threads for maintaining the positioning of the ring, clutch levers in the depressions for pressing the plates into engagement and free of any connection to the hub radially thereof, and means shiftable on the hub away from the ring for actuating the levers to engage the plates, one end of each lever fulcruming against the ring and an intermediate portion of the lever pressing against the clamping plate.

HENRY J. DUNKELOW.

References Cited in the file of this patent

UNITED STATES PATENTS

| Number | Name | Date |
| --- | --- | --- |
| 1,198,052 | Porter | Sept. 12, 1916 |
| 1,244,848 | Gadke | Oct. 30, 1917 |
| 1,282,666 | Wood | Oct. 22, 1918 |
| 1,885,236 | Davenport | Nov. 1, 1932 |
| 2,023,772 | Russo | Dec. 10, 1935 |
| 2,174,240 | Glenney | Sept. 26, 1939 |
| 2,402,897 | Kindig et al. | June 25, 1946 |
| 2,460,091 | Krause | Jan. 25, 1949 |
| 2,490,398 | Aschauer | Dec. 6, 1949 |